US012737637B2

(12) United States Patent
Dang et al.

(10) Patent No.: US 12,737,637 B2
(45) Date of Patent: Sep. 15, 2026

(54) MACHINE LEARNING MODEL TRAINING WITH ADVERSARIAL LEARNING AND TRIPLET LOSS REGULARIZATION

(71) Applicant: INTERNATIONAL BUSINESS MACHINES CORPORATION, Armonk, NY (US)

(72) Inventors: Xuan-Hong Dang, Chappaqua, NY (US); Dinesh C. Verma, New Castle, NY (US); Seraphin Bernard Calo, Cortlandt Manor, NY (US); Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 18/177,839

(22) Filed: Mar. 3, 2023

(65) Prior Publication Data

US 2024/0296334 A1 Sep. 5, 2024

(51) Int. Cl.

*G06N 3/094* (2023.01)
*G06N 3/045* (2023.01)
*G06N 3/096* (2023.01)

(52) U.S. Cl.

CPC ............. *G06N 3/094* (2023.01); *G06N 3/045* (2023.01); *G06N 3/096* (2023.01)

(58) Field of Classification Search

CPC ........ G06N 3/094; G06N 3/045; G06N 3/047; G06N 3/084; G06N 3/088; G06N 3/096

See application file for complete search history.

(56) References Cited

U.S. PATENT DOCUMENTS

| | | | |
|---|---|---|---|
| 10,354,199 | B2 | 7/2019 | Clinchant |
| 11,010,637 | B2 | 5/2021 | Marco |
| 11,106,182 | B2 | 8/2021 | Hosseini-Asl |
| 11,361,254 | B2 | 6/2022 | Butvinik |
| 11,443,242 | B2 | 9/2022 | Velizhev |
| 11,448,753 | B2 | 9/2022 | Rostami |
| 2019/0286073 | A1 | 9/2019 | Hosseini-Asl |

(Continued)

FOREIGN PATENT DOCUMENTS

CN 112541580 A * 3/2021 ............. G06N 3/045

OTHER PUBLICATIONS

Gong et al., Domain Adaptation with Conditional Transferable Components, 2016 (Year: 2016).*

(Continued)

*Primary Examiner* — Tamara T Kyle
*Assistant Examiner* — Jacqueline C. Meyer
(74) *Attorney, Agent, or Firm* — Caleb D. Wilkes

(57) ABSTRACT

A method, computer system, and a computer program product for training a machine learning model are provided. A first set of labelled training data from a source domain is obtained. A second set of labelled training data from a target domain is obtained. A number of labelled samples of the first set is greater than a number of labelled samples of the second set. The first machine learning model is trained with the first set and the second set and with a discriminator so that the discriminator is unable to distinguish whether a sample is from the first set or from the second set. The first machine learning model is trained with triplet loss regularization using the first set and the second set.

20 Claims, 7 Drawing Sheets

(56) References Cited

U.S. PATENT DOCUMENTS

| | | | | |
|---|---|---|---|---|
| 2019/0354807 | A1* | 11/2019 | Tsai | G06N 3/084 |
| 2020/0264300 | A1 | 8/2020 | Rostami | |
| 2021/0019629 | A1* | 1/2021 | Chidlovskii | G06N 3/094 |
| 2021/0192363 | A1 | 6/2021 | Kolouri | |
| 2021/0264318 | A1 | 8/2021 | Butvinik | |
| 2021/0295208 | A1 | 9/2021 | Xu | |
| 2021/0326749 | A1 | 10/2021 | Velizhev | |
| 2022/0180200 | A1 | 6/2022 | Yu | |
| 2022/0198339 | A1 | 6/2022 | Zhao | |
| 2022/0261633 | A1 | 8/2022 | Butvinik | |
| 2022/0261657 | A1 | 8/2022 | Puzanov | |
| 2022/0318567 | A1* | 10/2022 | Muhamedrahimov | G06F 18/23 |

OTHER PUBLICATIONS

Shuang Li et al., Domain Invariant and Class Discriminative Feature Learning for Visual Domain Adaptation, Jun. 2018 (Year: 2018).*

Lei Li et al., Unsupervised Domain Adaptation via Discriminative Feature Learning and Classifier Adaptation from Center-based Distances, May 2022 (Year: 2022).*

Luo, Deep learning based forecasting of photovoltaic power generation by incorporating domain knowledge, Mar. 2021 (Year: 2021).*

Bekkouch et al., Triplet Loss Network for Unsupervised Domain Adaptation, May 2019 (Year: 2019).*

Dash et al., A Review of Some Techniques for Inclusion of Domain-Knowledge into Deep Neural Networks, 2022 (Year: 2022).*

Deng et al., Rethinking Triplet Loss for Domain Adaptation, Jan. 2021 (Year: 2021).*

Lagunes-Fortiz et al., Learning Discriminative Embeddings for Object Recognition On-the-fly, 2019 (Year: 2019).*

Yin et al., Metric-learning-assisted Domain Adaptation, May 2021 (Year: 2021).*

Zonoozi et al., A Survey on Adversarial Domain Adaptation, Jul. 2022 (Year: 2022).*

Cao et al., TripletGAN: Training a Generative Model with Triplet Loss, Nov. 2017 (Year: 2017).*

Guo and Lovell, Domain-aware Triplet loss in Domain Generalization, Mar. 1, 2023 (Year: 2023).*

Hacohen and Weinshall, On The Power of Curriculum Learning in Training Deep Networks, May 2019 (Year: 2019).*

Komatsuzaki, One Epoch is All You Need, Jun. 2019 (Year: 2019).*

Blitzer et al., "Domain Adaptation with Structural Correspondence Learning," Proceedings of the 2006 Conference on Empirical Methods in Natural Language Processing (EMNLP 2006), Jul. 2006, https://aclanthology.org/W06-1615.pdf, pp. 120-128.

Fu et al., "Unsupervised Domain Adaptation Based on Pseudo-Label Confidence," IEEE Access, vol. 9, originally published Jun. 9, 2021, date of current version Jun. 23, 2021, pp. 87049-87057.

Hermans et al., "In Defense of the Triplet Loss for Person Re-Identification," arXiv:1703.07737v4 [cs.CV] Nov. 21, 2017, https://arxiv.org/pdf/1703.07737.pdf, 17 pages.

Li et al., "Cross-Domain Adaptive Clustering for Semi-Supervised Domain Adaptation," originally published Apr. 2021, EEE, Jun. 2021 IEEE/CVF Conference on Computer Vision and Pattern Recognition (CVPR), pp. 2505-2514.

Li et al., "Learning Invariant Representations and Risks for Semi-supervised Domain Adaptation," arXiv:2010.04647v3 [cs.LG] Apr. 4, 2021, https://arxiv.org/abs/2010.04647, 14 pages.

Motiian et al., "Few-Shot Adversarial Domain Adaptation," 31st Conference on Neural Information Processing Systems (NIPS 2017), arXiv:1711.02536v1 [cs.CV] Nov. 5, 2017, https://arxiv.org/pdf/1711.02536v1.pdf, 11 pages.

Nguyen et al., "STEM: An approach to Multi-source Domain Adaptation with Guarantees," IEEE, Oct. 2021 IEEE/CVF International Conference on Computer Vision (ICCV), pp. 9332-9343.

Rakshit et al., "Open-Set Domain Adaptation Under Few Source-Domain Labeled Samples," IEEE, Jun. 2022 IEEE/ Cvf Conference on Computer Vision and Pattern Recognition Workshops (CVPRW), pp. 4028-4037.

Singla et al., "Preparing Network Intrusion Detection Deep Learning Models with Minimal Data Using Adversarial Domain Adaptation," ACM, ASIA CCS '20, Oct. 5-9, 2020, https://dl.acm.org/doi/pdf/10.1145/3320269.3384718, pp. 127-140.

Tian et al., "VDM-DA: Virtual Domain Modeling for Source Data-free Domain Adaptation," IEEE Transactions on Circuits and Systems for Video Technology, vol. 32, No. 6, Jun. 2022, pp. 3749-3760.

Wang et al., "Generalizing from a Few Examples: A Survey on Few-Shot Learning," ACM Comput. Surv., vol. 1, No. 1, Article 1, Mar. 2020, arXiv:1904.05046v3 [cs.LG] Mar. 29, 2020, https://arxiv.org/pdf/1904.05046.pdf, 34 pages.

* cited by examiner

MACHINE LEARNING MODEL TRAINING WITH ADVERSARIAL LEARNING AND TRIPLET LOSS REGULARIZATION

STATEMENT REGARDING FEDERALLY SPONSORED RESEARCH OR DEVELOPMENT

This invention was made with government support under Contract Number W911NF-16-3-0001 awarded by the U.S. Army Research Laboratory and the U.K. Defence Science and Technology Laboratory. The U.S. and U.K. governments have certain rights to this invention.

BACKGROUND

The present invention relates to the fields of computers, artificial intelligence, automatic machine learning, transfer learning, multi-data modality, and data science, and more particularly to training machine learning models for new data domains so that the machine learning models can perform inference.

Current artificial intelligence-based machine learning models often require enormous amount of labeled data samples to train a reliable predictive model. In many practical applications, however, collecting and annotating a large number of samples is expensive and time-consuming.

In *Domain Adaptation with Structural Correspondence Learning* by Blitzer et al., a structural correspondence learning technique was applied to automatically induce correspondence among features from different domains. Both domains had ample unlabeled data, but only the source domain had labeled training data. A set of pivot features was defined on the unlabeled data from both domains. The pivot features were used to learn a mapping from original feature spaces of both domains to a shared, low-dimensional real-valued feature space. If a good mapping was learned, then the classifier learned on the source domain was also deemed to be effective on the target domain.

In *Preparing Network Intrusion Detection Deep Learning Models with Minimal Data Using Adversarial Domain Adaptation* by Singla et al., adversarial domain adaptation was evaluated to address the problem of scarcity of labeled training data in a dataset by transferring knowledge gained from an existing network intrusion dataset. A GAN architecture with a generator and discriminator that were artificial (deep) neural networks with the same layer configuration were used to perform adversarial domain adaptation. The main objective of the model was then to learn a classifier that could accurately predict whether data samples in a target domain belonged to an attack class or to a benign class. Samples from the source and target data distributions were taken and converted into a domain-invariant representation to fool the discriminator into misclassifying the representations generated by the generator. However, in most scenarios where the source dataset had a different feature space than the target dataset, Singla et al. indicated a lack of interest for the efficacy of the trained model in identifying the attacks contained in the source dataset.

US 2022/0198339 A1 to Zhao et al. disclosed systems and methods for training a machine learning model based on cross-domain data. A first processing unit of the machine learning model was associated with a first loss function. An adversarial unit of the machine learning model was associated with a second loss function. A second processing unit of the machine learning model determined multiple second source prediction outputs based on source features and determined multiple second target prediction outputs based on target features. The machine learning model performed a third loss function that reflects the consistency of the first processing unit and the second processing unit.

Reusing well-trained artificial intelligence model from a closely related domain or fine tuning an existing artificial intelligence model often leads to less reliable models and sub-optimal solutions. With adversarial learning alone, there is no guarantee that samples with the class labels in two domains are mapped close to each other. Using conventional adversarial learning can lead to failure in classification because a trained target model might predict samples from a single class as being from a variety of different classes. Some extraneous features may be beneficial in the source domain but might distract a target model from learning more fundamental features for the target domain.

A need exists to provide a training scheme for training an artificial intelligence machine learning model that has only an extremely limited number of annotated training data samples available for training. A need exists to better leverage the more extensive labelling from a source domain. A need exists to produce such a training scheme that can be performed more quickly to train a machine learning model to be able to accurately perform class prediction.

SUMMARY

According to one exemplary embodiment, a method for training a machine learning model is provided. According to the method, a first set of labelled training data from a source domain is obtained. A second set of labelled training data from a target domain is obtained. A number of labelled samples of the first set is greater than a number of labelled samples of the second set. The first machine learning model is trained with the first set and the second set and with a discriminator so that the discriminator is unable to distinguish whether a sample is from the first set or from the second set. The first machine learning model is trained with triplet loss regularization using the first set and the second set. A computer system and computer program product corresponding to the above method are also disclosed herein.

In this manner, a training scheme is provided for training an artificial intelligence machine learning model that can use a small number of annotated training data samples in a target domain by successfully leveraging more extensive labelling from a source domain. Such a training scheme may be helpful when time and or cost constraints prohibit production of extensive labelled data for the target domain. The trained artificial intelligence model may be able to successfully perform classification despite the minimal amount of labelled data from the target domain.

In some additional embodiments, the training of the first machine learning model with the discriminator and with the triplet loss regularization occurs iteratively based on refining of a sample pool of the first set. The sample pool is refined and/or filtered by evaluating relevancy of the first set in a latent common embedding space between the first set and the second set. The refining may include comparing a first distance between a matching pair to a second distance between a non-matching pair to determine a triplet function value. The matching pair and the non-matching pair may each belong to a triplet and may include an anchor sample from the second set and a respective additional sample from the first set. The refining may further include discarding a first triplet for the iterative training in response to the triplet function value for a first triplet not exceeding a threshold value.

In this manner, a changing embedding space may facilitate updating sample pools so that most relevant sample triplets are kept for the training, required training time for the model is reduced, the convergence rate is increased, and model stability is improved. The number of overhead computations for training an effective machine learning model for the target domain may be reduced by increasing the frequency of calculating distances among samples.

In some additional embodiments, a classifier of the first machine learning model is trained using classification loss from the first set and the second set. A first generator encoder of the first machine learning model is updated based on (1) domain loss from the training of the discriminator, (2) distance loss from the training with the triplet loss regularization, and (3) classification loss from training a classifier of the first machine learning model using the first set and the second set. The trained first machine learning model for use in an inference phase includes the updated first generator encoder and the trained classifier.

In this manner, tradeoff factors among the losses may be tuned, e.g., using cross-validation, and the trained artificial intelligence model hereby produced may successfully perform classification despite the minimal amount of labelled data from the target domain.

In some additional embodiments, classification is performed with the trained first machine learning model via (1) inputting a new sample into the updated first generator encoder so that the updated first generator encoder generates an embedding in an embedding space and (2) inputting the embedding into the trained classifier so that the trained classifier produces a class prediction.

In this manner, the trained artificial intelligence model hereby produced successfully performs classification for a new domain. The trained artificial intelligence model may be used to perform a wide variety of machine learning tasks such as image classification, sound classification, natural language processing tasks, automated question-and-answer, etc.

In some additional embodiments, a second generator encoder is updated based on (1) domain loss from the training with the discriminator, and (2) classification loss from training a classifier of the first machine learning model using the first set and the second set.

In this manner, a source-side generator encoder and a target-side generator encoder may be used for the training with the discriminator and for the training of the classifier so that labelled samples from the source domain may be leveraged to accelerate training within the target domain.

In some additional embodiments, the triplet loss regularization includes penalization in response to samples from the second set being mapped at a distance greater than a distance threshold from samples from the first set and from the second set having the same class labels as the samples from the second set. The triplet loss regularization may also include penalization in response to samples from the second set being mapped at a distance less than a distance threshold from samples from the first set and from the second set having different class labels as the samples from the second set.

In this manner, training is conducted in an accelerated time frame to achieve a robust and effective machine learning model for a new domain in which few labelled samples were present for the domain.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
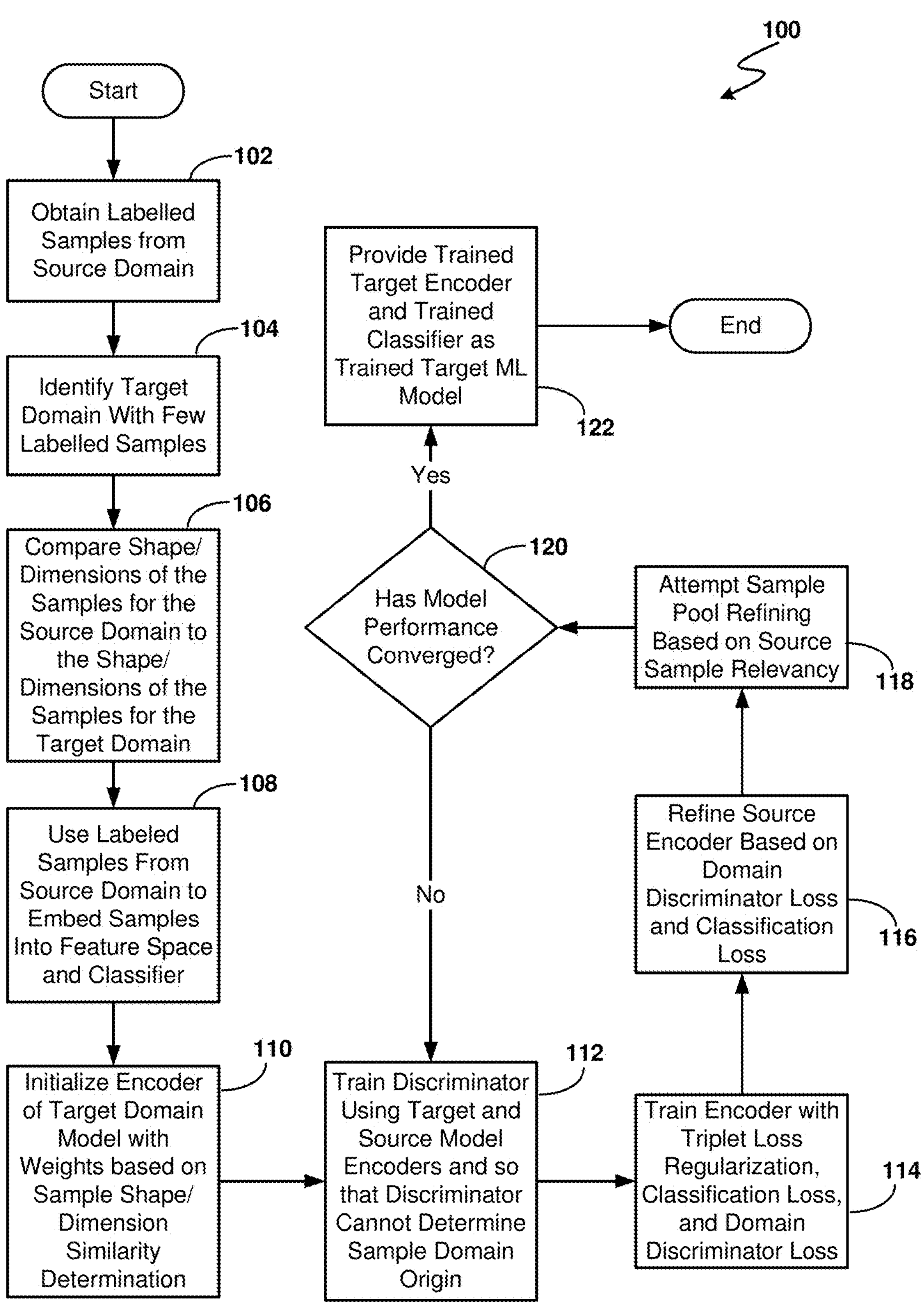
FIG. 1 is an operational flowchart illustrating a machine learning model accelerated training process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a computer-implemented method, a computer system, and a computer program product for training a machine learning model in an accelerated manner and so that the so-trained machine learning model is able to perform prediction reliably. The training may be successfully completed using a lower number of annotated training data samples for a target domain. Such training is particularly helpful in situations where an urgent need exists for machine learning model prediction to begin as soon as possible. Such training is also particularly helpful in situations where implementation of machine learning in one particular environment might be short-term so that long-term data and sample collection is not possible. In some instances, machine learning prediction is desired for implementation in frequent new environments. By better harnessing the learning of a source domain that is different from the target domain, the present embodiments allow an accelerated training of a machine learning process even with an extremely limited number of annotated training data samples for the target domain. By providing this machine learning training that may occur in an automated manner, the technology of artificial intelligence and machine learning is improved.

Machine learning is a branch of artificial intelligence (AI) and computer science which focuses on the use of data and algorithms to imitate the way that humans learn, gradually improving its accuracy. Neural networks, or artificial neural networks (ANNs), include node layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network by that node. The "deep" in deep learning may refer to the number of layers in a neural network. A neural network that consists of more than three layers—which would be inclusive of the input and the output—can be considered a deep learning algorithm or a deep neural network. A neural network that only has three layers may be referred to as a basic neural network. Deep learning and neural networks are credited with accelerating progress in areas such as computer vision, natural language processing, and speech recognition. The present embodiments improve a training process for a machine learning model so that the training may occur in an accelerated manner even with the availability of few labelled samples from a target domain.

Supervised learning, also known as supervised machine learning, is defined by its use of labeled datasets to train algorithms to classify data or predict outcomes accurately. As input data is fed into the machine learning model, the machine learning model adjusts its weights until the machine learning model has been fitted appropriately. As part of that process the label is also provided to the machine learning model so that the model learns to associate a correct class with the sample that is provided. The model fitting occurs as part of the cross validation process to ensure that the model avoids overfitting or underfitting. Supervised learning helps solve a variety of real-world problems at scale, such as classifying spam in a separate folder from an inbox. Some structures and/or methods used in supervised learning include neural networks, naïve bayes, linear regression, logistic regression, random forest, and support vector machine (SVM).

The present embodiments include the combination of adversarial training steps as well as triplet loss regularization to better harness the already-achieved learning of labelled samples from a source domain that is different from the target domain. By combining these techniques, the present embodiments achieve improved machine learning model accuracy compared to models trained with only one or the other of these techniques and compared to an existing model with classifier training only.

The present embodiments include training the first machine learning model with a discriminator in an adversarial manner so that the discriminator is unable to distinguish whether a sample is from a source domain or from a target domain. In this manner, the machine learning model learns to better accept the ground truth information from the source domain because the annotated samples from both domains are treated as being part of a single set. A discriminator is used to train encoders for the machine learning model. The discriminator attempts to predict whether a submitted sample having been embedded into an embedding space is from one of the two source possibilities (source domain or target domain). The weights of the encoders are adjusted to attempt to fool the discriminator so that the discriminator is unable to distinguish from which source possibility the sample originated. Due to this competition and back-and-forth adjustment, the weights of the encoders are eventually adjusted and optimized so that the machine learning model learns to better accept all of the labelled samples as being part of a single set.

The present embodiments include triplet loss regularization as a technique to guide the predictions of the being-trained machine learning model to better match the labels of the samples provided. The triplet loss regularization optimizes the neural network layer and/or node weights for producing embeddings in the embedding space z so that data points with the same class identity are closer to each other than to data points for other class identities. The labelled samples may be separated into triplet groups with an anchor sample "a" from the target domain that has a known class due to the label that is provided. The triplet group may also further include a positive sample "p" that has a known class the same as the anchor sample. The class of the positive sample is also known due to the label that is provided. The triplet group may also further include a negative sample "n" that has a known class that is different from the class of the anchor sample. The class of the negative sample is also known due to the label that is provided. The triplet loss regularization may include distance regularization between one or more of the following triplet data sets (with "t" referring to the target domain and "s" referring to the source domain):

(a) $L(a^t, p^t, n^t)$: penalizes if samples $a^t$ and $p^t$ are mapped far apart in z, while $a^t$ and $n^t$ are mapped close (within the target domain);

(b) $L(a^t, p^t, n^s)$: penalizes if samples $a^t$ and $p^t$ are mapped far apart in z, while $a^t$ and $n^s$ are mapped close (across two domains);

(c) $L(a^t, p^s, n^t)$: penalizes if samples $a^t$ and $p^s$ are mapped far apart in z, while $a^t$ and $n^t$ are mapped close (across two domains); and (d) $L(a^t, p^s, n^s)$: penalizes if samples $a^t$ and $p^s$ are mapped far apart in z, while $a^t$ and $n^s$ are mapped close (across two domains)

where an $L(a, p, n)=[d_p-d_n+m]_+$ with $d_p$ being a function that measures the distance between (a, p), and $d_n$ being a function that measures the distance between (a, n) in the embedding space, and m being a positive margin factor. Compared to the first three triple set possibilities, the number of triplet samples used for $L(a^t, p^s, n^s)$ is the largest because both p, n are sampled from the source domain. The present embodiments may include the most potential samples in a "pool" and may include refining the pool and its samples as part of the regularization and model training.

The present embodiments help developers to take an end-to-end approach for retrieving data, training a model, saving the trained model, and implementing the trained model.

In one example a target domain is monitoring for vehicular activity in a desert environment by the gathering of image samples. Those seeking usage of the machine learning model for this purpose may have few samples of the images of the vehicular activity in the desert that they can provide to the machine learning model for training same. To accelerate model training, predictive power of a different source domain with many labelled samples may be harnessed. For this vehicular activity example, labelled samples that were used for training a machine learning model that predicted vehicular activity in a city environment were obtained. The number of labelled samples of the vehicular activity in the city may be numerous, e.g., greater than the number of labelled samples of vehicular activity in the desert.

In other examples, a new domain is sought in another environment such as identifying objects such as vehicles in an Arctic environment, in an Antarctic environment, in a water environment, in an underwater environment, in a forest environment, etc. The object that is sought to be identified in a predictive manner may be a vehicle such as an airplane, a submarine, etc. The source domain used to harness machine learning training for these other domains may be any for which a large number of labelled samples is had or readily available.

In one example a target domain is monitoring for anomalous sound detection for machine condition monitoring after a domain shift. Anomalous sound detection is a task of identifying whether a sound emitted from a machine is normal or anomalous. This type of sound detection is a helpful technology for detecting mechanical failures. While labeled samples are often collected under ideal conditions, due to domain shifts it is more challenging to obtain substantial samples for supervised training in real-world cases. For example, training sounds from a product conveyor are collected in one season, but anomalous sound detection requires continuously monitoring the conveyor through all seasons, under different operating conditions. For example, a conveyor may need to be monitored in a wide variety of situations such as a variation of motor speed in response to product demand, uncontrollable fluctuating noise from different environments, etc. Collecting sufficient training data in all conditions/environments is unrealistic. Hence, the present embodiments may harness learning from training data sets already obtained to train the machine learning model for the new situation. The present embodiments are capable of transferring and adapting knowledge in the source domain to a novel target domain with extremely limited annotated data samples. The present embodiments may be implemented with binary class settings such as normal vs. anomalous. The present embodiments may be implemented with multiple class settings for different levels of mechanical failures.

In some embodiments, labelled samples from the target domain and from the source domain may have similar types and/or modalities such as both being image data. In other embodiments, labelled samples from the target domain and from the source domain may have some different types and/or modalities such as, in one example, the target domain providing image samples and the source domain providing sound samples and, in another example, the target domain providing sound samples and the source domain providing image samples. The present embodiments may still through the discussed techniques be able to harness the learning from the earlier labelled data set despite the differences in sample/data modality type.

Referring now to FIG. 1, an operational flowchart is shown that illustrates a machine learning model accelerated training process 100 according to at least one embodiment.

Figure 2:
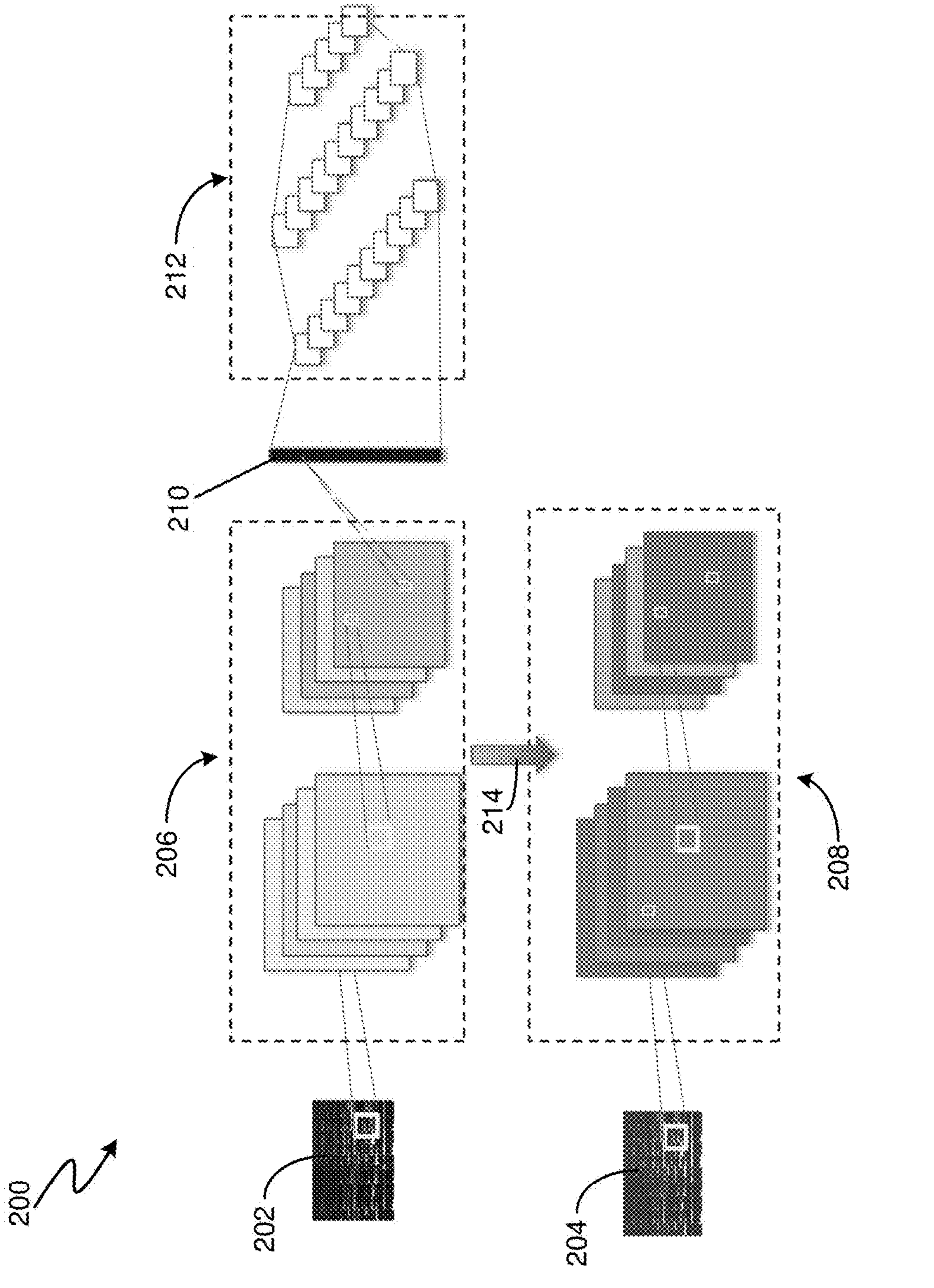
FIG. 2 illustrates aspects of at least one embodiment of initial training that is part of the machine learning model accelerated training process of FIG. 1.
Figure 3:
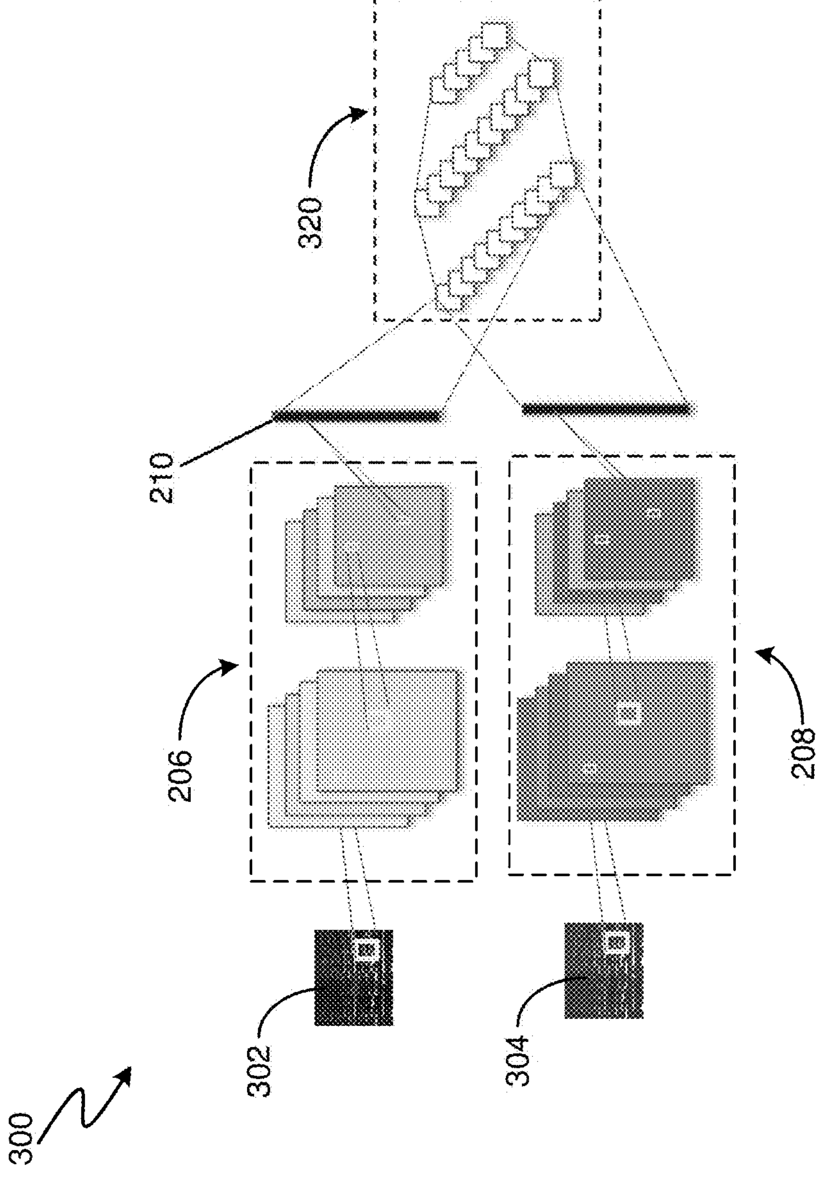
FIG. 3 illustrates aspects of at least one embodiment of domain discriminator training that is part of the machine learning model accelerated training process of FIG. 1.
Figure 4:
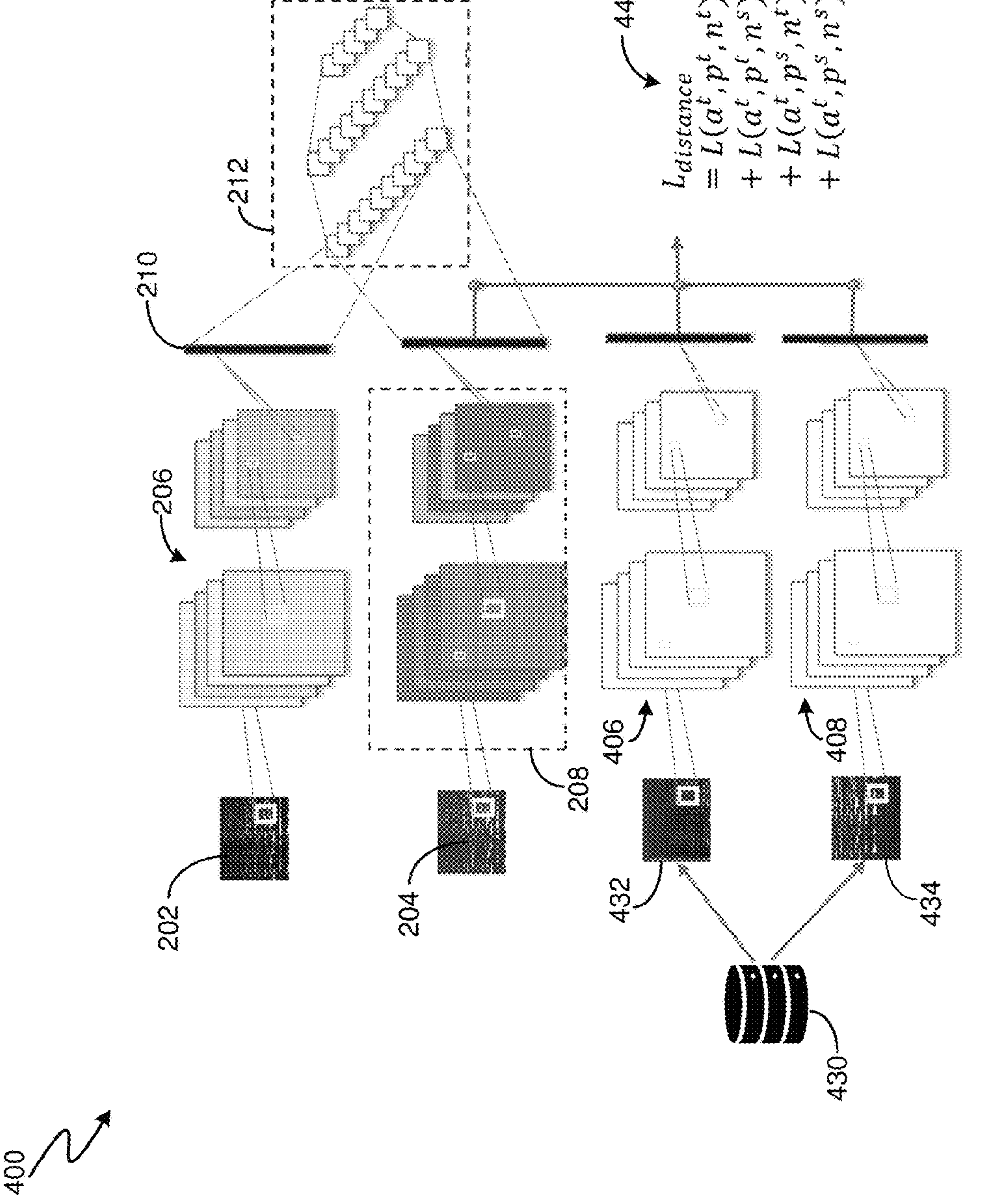
FIG. 4 illustrates aspects of at least one embodiment of encoder training that is part of the machine learning model accelerated training process of FIG. 1.

In step 102 of the machine learning model accelerated training process 100 shown in FIG. 1, labelled samples from a source domain are obtained. In at least some embodiments, all of the samples taken from the source domain are labelled and, therefore, constitute ground truth-holding members. In at least some embodiments, a number of the labelled samples that are received in step 102 from the source domain will exceed, i.e., be greater than, a number of the labelled samples that are to be received in step 104 from the target domain. In FIGS. 2-4, these samples obtained in step 102 are shown as labelled source domain samples 202.

In one example a target domain is monitoring for vehicular activity in a desert environment by the gathering of image samples. Those seeking usage of the machine learning model for this purpose may have few samples of the images of the vehicular activity in the desert to provide the machine learning model for training same. To accelerate model training, predictive power of a different source domain with many labelled samples may be harnessed. For this vehicular activity example, in step 102 labelled samples that were used for training a machine learning model that predicted vehicular activity in a city environment were obtained. The number of labelled samples of the vehicular activity in the city may be numerous, e.g., greater than the number of labelled samples of vehicular activity in the desert.

Figure 7:
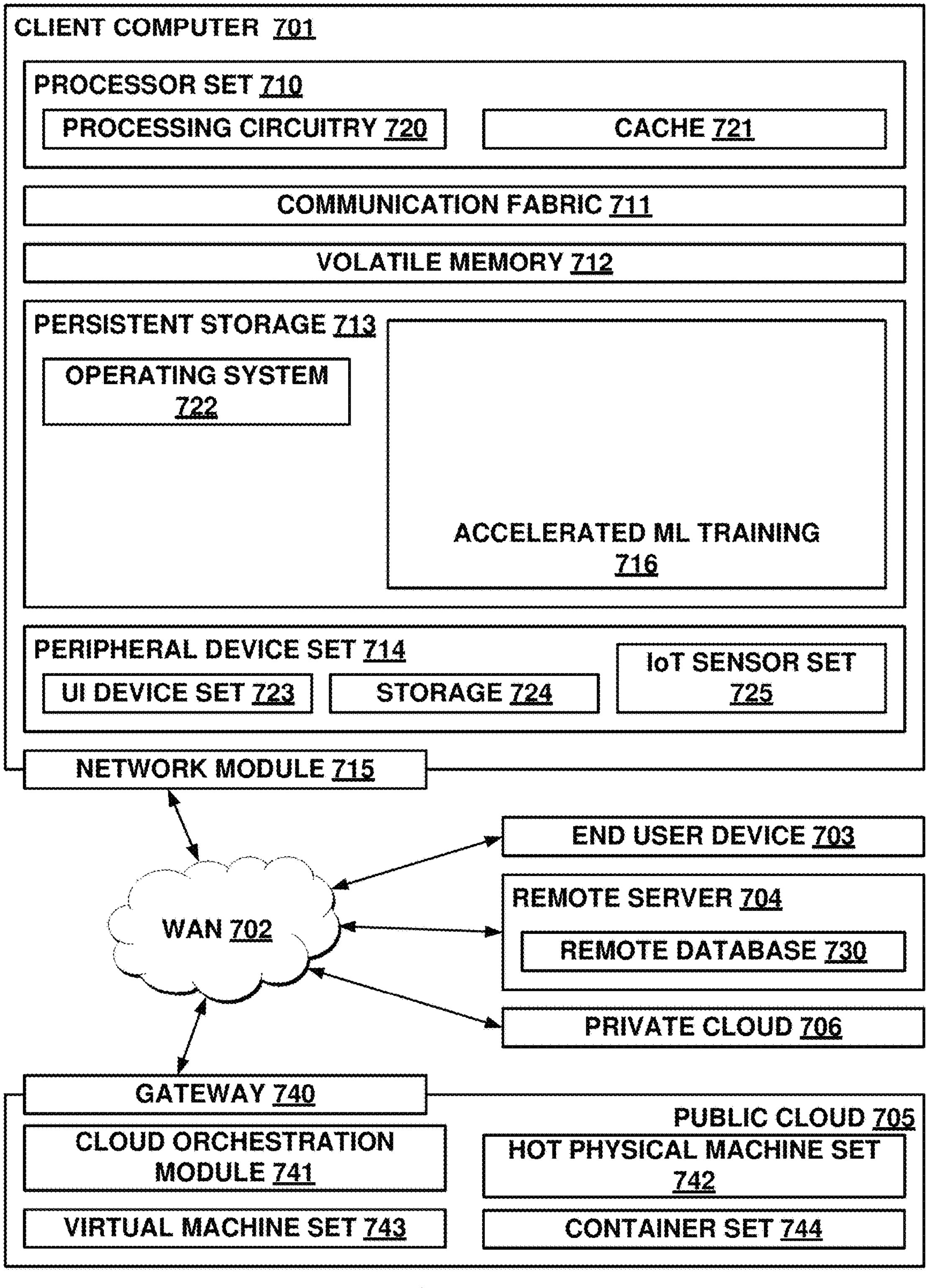
FIG. 7 is a block diagram illustrating a computer environment with multiple computer systems in which the machine learning model accelerated training process described for FIG. 1 and/or the prediction performance illustrated in FIG. 6 may be implemented.

In at least one embodiment, the obtaining of step 102 includes receiving the labelled samples as one or more digital files. The receiving may occur via a transmission over a communication network such as the wide area network 702 that is shown in FIG. 7. The obtaining may include one or more computers such as the client computer 701 and/or the remote server 704 receiving the one or more digital files via that network transmission. The obtaining may occur via the accelerated ML, training program 716 receiving an uploaded file at the computer 701.

In step 104 of the machine learning model accelerated training process 100 shown in FIG. 1, a target domain with few labelled samples is identified. In at least some embodiments, a number of the labelled samples that are identified in step 104 along with the target domain is less than a number of the labelled samples that were received from the source domain in step 102. In FIGS. 2-4, the labelled samples that are part of the target domain identified in step 104 are shown as labelled target domain samples 204. In at least some embodiments, the number of labelled samples that are identified in step 104 along with the target domain includes a few labelled samples per class. For example, in a binary prediction model there may be four labelled samples provided—two of a first class and two different ones of a second class. In one embodiment, the number of labelled samples that are identified in step 104 along with the target domain includes one respective labelled sample per class.

For the desert vehicular activity example, in step 104 labelled samples that were used for training a machine learning model that predicted vehicular activity in a desert environment were obtained. The number of labelled samples of the vehicular activity in the desert may be less than, e.g., substantially less than, the number of labelled samples of vehicular activity in the city. For a model with five different vehicle types, the step 104 may include receiving ten different labelled samples (two each for the five different vehicle types). For a model with five different vehicle types, the step 104 may include receiving five different labelled samples (one each for the five different vehicle types).

In at least one embodiment, the identification of step 104 includes receiving labelled target domain samples 204 as one or more digital files. The receiving may occur via a transmission over a communication network such as the wide area network 702 that is shown in FIG. 7. The obtaining may include one or more computers such as the client computer 701 and/or the remote server 704 receiving the one or more digital files via that network transmission. The obtaining may occur via the accelerated ML training program 716 receiving an uploaded file at the computer 701.

In step 106 of the machine learning model accelerated training process 100 shown in FIG. 1, the shape/dimensions of the samples for the source domain are compared with the shape/dimensions of the samples for the target domain. The samples for the source domain refers to those received in step 102. The samples for the target domain refers to those that were with the target domain that was identified in step 104. The dimensions of a respective labelled sample are equal to the number of inputs, features, and/or measurement variables of that sample. Shapes are tuples representing how many elements an array or tensor has in each dimension. For example, a shape (20, 4, 8) means an array or tensor with 3 dimensions, containing twenty elements in the first dimension, four elements in the second dimension, and eight elements in the third dimensions, totaling 30*4*10=640 elements or numbers. For an image sample, the shape/dimensions may include elements/features such as color (red, green, and blue intensity), black and white, image size with pixel numbers, etc. For an audio sample, the shape/dimensions may include elements/features such as wave frequencies, intensities, wave durations, decibels, pitch, etc.

In some embodiments step 106 is performed by submitting the samples to a machine learning model that has been trained to recognize the shape/dimensions of a data set. The output of the machine learning model indicates the shapes/dimensions of the data set. In other embodiments, step 106 may be performed via a subject matter expert who analyzes the samples and manually inputs the shape/dimensions to the accelerated ML training program 716. Such input may occur by way of the UI device set 723 that is connected to the computer 701, that may receive input from a user such as subject matter expert, and that may transmit the data signal through a bus of the computer 701 to the accelerated ML training program 716 stored on the persistent storage 713 of the computer 701.

In step 108 of the machine learning model accelerated training process 100 shown in FIG. 1, labelled samples from the source domain are used to embed samples into a feature space and a classifier. FIG. 2 shows an initialization view 200 which includes an example of step 108 taking place in that the labelled source domain samples 202 are input into source-side encoders 206. The encoders such as the source-side encoders 206 and/or the target-side encoders 208 may be multi-layer neural networks such as a convolutional neural network ("CNN") or a recurrent neural network ("RNN") depending on the implemented applications and input type. For example, a CNN may be implemented to perform machine learning on acoustic spectrum images.

In response to the inputting, the source-side encoders 206 produce an embedding in the embedding z-space 210. The embedding represents a particular sample, respectively. An embedding is a low-dimensional space into which high-dimensional vectors are translated. Embeddings make it easier to do machine learning on large inputs. Ideally, an embedding captures some of the interrelationships of the features of the input so that similar data samples are placed close together in the embedding space. Embeddings are used to represent data in a space with "d" dimensions, where d is the number of dimensions of the embedding matrix. Every data point is then represented by a vector of length d, and similar data points are going to be clustered close to one another. Each dimension represents a different aspect or feature of the data.

In response to generating an embedding in the embedding z-space 210, the embedding is input into a classifier 212 which, in response, produces a prediction of a class of the embedding. The predicted class, therefore, is a prediction of the class of the input sample. Because the labelled source domain samples 202 are labelled and are provided with a correct classification, this inputting may begin a training of the classifier 212. The classifier such as the classifier 212 may be a multilayer network with a last layer as a softmax that uses cross entropy for the loss function.

The source-side encoder 206 used in step 108 may be already trained and taken from a machine learning model for the source domain or may be untrained and trained by inputting the extensive labelled source samples 202.

In step 110 of the machine learning model accelerated training process 100 shown in FIG. 1, an encoder of the target domain model is initialized with weights based on the sample shape/dimension similarity comparison. This comparison refers to the shape/dimension comparison of step 106. As described below, the initialization view 200 shown in FIG. 2 includes an example of step 110 being performed.

For instances in which the comparison indicates that the target samples have shapes and/or dimensions which pass a similarity threshold with respect to corresponding shapes and/or dimensions of the labelled training data of the source samples, the initialization of step 110 includes implementing weights of the source encoders 206 as weights for the target encoders 208. In FIG. 2, this weight implementation is indicated with the weight transfer arrow 214. In this instance, the source-side encoders 206 in at least some embodiments are extracted from an already-trained model for the source domain. The accelerated ML training program 716 may, in an automated manner, analyze programming code of the already-trained machine learning of the source domain, identifying linking code between different code portions that perform the layers, and extract the layers for the encoder portions. The programming code may be in one of a variety of programming languages. In other embodiments, a programmer uses the client computer 701 to perform the above-mentioned code analysis, linking code identification, and portion extracting so that the source-side encoders 208 are extracted or other portions are extracted and the source-side encoders 208 remain. The various layers may in some embodiments be represented respectively in different parts of the programming code. Such different code areas may in at least some embodiments be joined together via programming connectors such as loops. Different layers of the machine learning model may be joined together via a respective loop. After the source-side encoders 208 are obtained, their weights may be copied over to the target-side encoders 210 via an automated command in a ML modification/initialization program.

For instances in which the comparison indicates that the target samples have shapes and/or dimensions which fail a similarity threshold with respect to corresponding shapes and/or dimensions of the labelled training data of the source samples, the initialization of step 110 includes randomly initializing weights of the target-side encoder 208. In these instances, a random distribution such as a uniform distribution and/or a gaussian distribution may be selected for the initialization of the weights of the target-side encoders 208. The accelerated ML training 716 in some embodiments performs this random initialization in an automated manner via a random weight installation programming command.

For some instances, the initialization of step 110 in some embodiments includes randomly initializing weights of the target-side encoder 208 for one or more initial layers and transferring and/or copying, from the source-side encoders 206, weights for latter layers of the target-side encoder 208 which are closer to the embedding z-space 210. This approach allows for (1) weight differences in initial layers due to differences in samples but (2) converging machine learning weight values as the encoders approach the embedding z-space 210. This converging at the later layers of the two encoders 206, 208 helps the trained machine learning model learn to assimilate samples from the different sources as the signals enter the embedding z-space 210. This assimilation helps the accelerated ML training program 716 better evaluate samples from the labelled source samples 202 which are most similar to the labelled target samples 204, and, therefore, are most valuable for use in helping to train the new target domain-focused machine learning model in an accelerated manner.

In step 112 of the machine learning model accelerated training process 100 shown in FIG. 1, a discriminator is trained using target and source model encoders and so that the discriminator cannot determine sample domain origin. FIG. 3 shows a discriminator-involved training view 300 which includes an example of step 112 taking place. FIG. 3 shows many of the same elements and/or components that were shown for the initialization view 200 in FIG. 2. FIG. 3 shows that for the discriminator-involved training, source-domain samples 302 and target-domain samples 304 are both input into the encoders. Different from the labelled source-domain samples 202 and the labelled target-domain samples 204 shown in FIG. 2, however, the source-domain samples 302 and target-domain samples 304 are input into the encoders while ignoring the labels. The samples may otherwise be the same except that the labels are ignored or are input with the labels removed or not received. As part of the ignoring of the class label information, the training for the discriminator 320 does not include instructing the discriminator to choose a class for the samples. The source-domain samples 302 may be input into the source-side encoders 206. The target-domain samples 304 may be input into the target-side encoders 208. The inputting of the samples into the encoders causes the encoders to generate an embedding representing the input into the embedding z-space 210. The embeddings from the embedding z-space 210 are then fed into the training discriminator 320 which itself is a classifier. The classifier in at least some embodiments includes a softmax layer as an output layer.

The training discriminator 320 then seeks to predict whether the embedding came from the source-side samples 302 or from the target-side samples 304. This prediction constitutes the classification by the training discriminator 320. Thus, the training discriminator 320 is itself a classifier which may perform binary entropy. The prediction is challenging for the training discriminator 320 because the samples are submitted to training discriminator 320 without indicating which domain (source or target) provided the sample. This training of the training discriminator 320 is part of adversarial training and is intended to develop so that the training discriminator 320 is unable to distinguish whether a sample is from the source-side samples 302 or from the target-side samples 304. In this manner, the machine learning model learns to better accept the ground truth information from the source domain because the annotated samples from both domains are treated as being part of a single set. The training discriminator 320 may perform binary cross entropy to produce a domain loss function. The training discriminator 320 is updated to minimize this loss which is computed for samples from both domains and which may be computed from labeled and/or unlabeled samples. In the discriminator-involved training view 300 the source side encoder 206 and the target side encoder 208 initially perform with their weights frozen to produce the embeddings in the embedding z-space that are then fed to the training discriminator 320.

An adversarial aspect of this training includes adjusting the encoder weights to attempt to fool the discriminator so that the discriminator is unable to distinguish from which source possibility the sample originated occurs in a subsequent stage. Due to that subsequent adjustment a back-and-forth competition occurs with the training discriminator 320 seeking to predict sample origin possibility (source or target) and the encoder being adjusted to try to fool the training discriminator 320. The loss with respect to the target samples is kept track of via the accelerated ML, program 716 in order to subsequently update the encoder networks.

In step 114 of the machine learning model accelerated training process 100 shown in FIG. 1, the encoder is trained with triplet loss regularization, with classification loss, and with domain discriminator loss. FIG. 4 shows an encoder training view 400 which includes an example of step 114 taking place. FIG. 4 shows some of the same elements and/or components that were shown for the initialization view 200 in FIG. 2 and/or for the discriminator training view 300 shown in FIG. 3.

FIG. 4 shows that the target encoder 208 is trained along with the classifier 212 through classification loss. In response to receiving an input of one of the labelled target samples 204 and/or one of the labelled source samples 202 into the target-side encoders 208 and/or the source-side encoders 206, respectively, the particular encoder generates an embedding in the embedding z-space 210 that represents the particular sample. The embedding is then input into the classifier 212 which, in response, produces a prediction of a class of the embedding. The predicted class, therefore, is a prediction of the class of the input sample. Because the labelled samples are labelled and are provided with a correct classification, this inputting may be part of training of the classifier 212. The classifier such as the classifier 212 may be a multilayer network with a last layer as a softmax that uses cross entropy for the loss function. The weights of the source-side encoder 208 are adjusted by the accelerated ML training program 716 in order to optimize the loss function for the classification. The classifier 212 itself is also adjusted based on the classification loss that is determined, particularly to reduce the classification loss. This adjustment occurs by adjusting weights of layers and/or nodes of the classifier 212.

Figure 5:
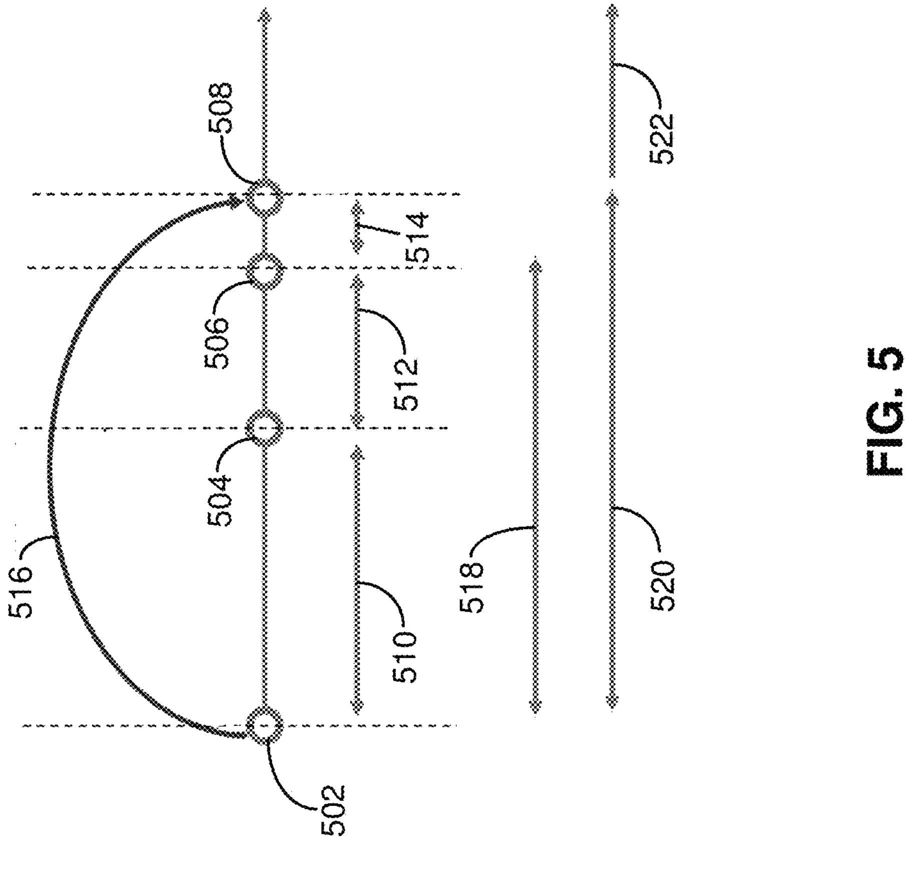
FIG. 5 illustrates aspects of at least one embodiment of sample pool refinement that is part of the machine learning model accelerated training process of FIG. 1.

FIG. 4 also shows that a sample pool 430 of the source side samples is refined by performing a triplet loss regularization aspects of which are also further illustrated in FIG. 5. The sample pool 430 is divided into source-domain samples 432 and target-domain samples 434. The source-domain samples 432 include positive and negative samples from the labelled source domain labels 202 with respect to an anchor sample selected from the target domain samples. The positive samples are from a same class as the anchor sample from the labelled target samples 204. The negative samples are from a different class than the class of the anchor sample. The target-domain samples 434 include positive and negative samples from the labelled target domain labels 204. These samples are embedded into frozen versions of the encoders, namely a frozen source-side encoder 406 and a frozen target-side encoder 408, respectively. These frozen encoders generate embeddings within the embedding z-space 210 which output into a triplet loss regularization function 440. The anchor sample "a" from the target domain has a known class due to the label that is provided. The triplet loss regularization may include distance regularization between one or more of the following triplet data sets (with "t" referring to the target domain and "s" referring to the source domain):

(a) $L(a^t, p^t, n^t)$: penalizes if samples $a^t$ and $p^t$ are mapped far apart in z, while $a^t$ and $n^t$ are mapped close (within the target domain);

(b) $L(a^t, p^t, n^s)$: penalizes if samples $a^t$ and $p^t$ are mapped far apart in z, while $a^t$ and $n^s$ are mapped close (across two domains);

(c) $L(a^t, p^s, n^t)$: penalizes if samples $a^t$ and $p^s$ are mapped far apart in z, while $a^t$ and $n^t$ are mapped close (across two domains); and (d) $L(a^t, p^s, n^s)$: penalizes if samples $a^t$ and $p^s$ are mapped far apart in z, while $a^t$ and $n^s$ are mapped close (across two domains)

where an $L(a, p, n)=[d_p-d_n+m]_+$ with $d_p$ being a function that measures the distance between (a, p), and $d_n$ being a function that measures the distance between (a, n) in the embedding space, and m being a positive margin factor. The "+" assures that the value is non-negative, e.g., so that whenever $d_p-d_n+m<0$ the value is set to "0" instead. With this feature the model assures that any loss L(a, p, n) that is trying to minimize will never be a negative value. Compared to the first three triplet set possibilities, the number of triplet samples used for $L(a^t, p^s, n^s)$ is the largest of the four groups, because both p, n are sampled from the source domain. The sample pool 430 with this fourth group is refined and identified and then provided as the labelled source-side samples 202 for refining the encoders 206, 208 and the classifier 212.

The pool of potential samples from the source domain is not fixed as the embedding z-space 210 is gradually learnt and, of course, is not in a proper shape at early training phase/epochs (e.g., because noise and/or irrelevant features have not yet been filtered out from the samples). In addition, maintaining this pool of samples across domains reduces overhead computations as distances among the samples are frequently calculated.

Also occurring during the encoder training view 400 is further adversarial training with the training discriminator 320. The training discriminator 320 seeks to predict the domain origin of a submitted sample, while the encoders 206, 208 are adjusted to try to prevent the training discriminator 320 from correctly predicting the domain origin. Thus, the weights of the target-side encoder 208 are updated with the discriminator domain loss for target samples.

Thus, the target-side encoder 208 which will be part of the final machine learning model for implantation in the new domain is trained as part of the encoder training view 400 with triplet loss regularization, with classification loss, and with domain discriminator loss.

In step 116 of the machine learning model accelerated training process 100 shown in FIG. 1, the source encoder is refined based on the domain discriminator loss and classification loss. The encoder training view 400 shown in FIG. 4 also illustrates aspects of step 116 via the training of the source-side encoder 206. The classification loss that is determined with the classifier 212 is used to update the weights of the source-side encoder 206. The domain discriminator training that was shown in FIG. 3 also is used as part of step 116 to update the weights of the source-side encoder 206. Moreover, for those embodiments in which the source-side encoder 206 and the target-side encoder 208 share weights the source-side encoder 206 is updated with the aggregated loss for the target-side encoder 208. Thus, the machine learning model accelerated training process 100 includes the updating of not only the target-side encoder 208 in preparation for implementation in the target domain, but also updating of the source-side encoder 206 to achieve more accurate discriminator domain loss calculation and classification loss calculation.

In step 118 of the machine learning model accelerated training process 100 shown in FIG. 1, sample pool refining is attempted based on source sample relevancy. FIG. 5 shows with its sample pool refining graph 500 an example of aspects of performance of step 118 according to at least one embodiment. FIG. 4 above also with respect to the sample pool 430 illustrated aspects of the step 118.

The sample pool refining graph 500 includes a first anchor sample 502 shown as a first graph point which, as described previously, represents a labelled target sample from the target domain. The sample pool refining graph 500 includes a first positive sample 504 shown as a second graph point which, as described previously, represents a labelled source sample which is from a same class as the anchor sample is from and which is from the source domain. Thus, the second arrow 510 shown in FIG. 5 represents a distance between the first anchor sample 502 and the first positive sample 504. This distance may be indicated by the function $d_p(a^t, p^s)$ meaning that the anchor sample is from the "t" target domain and the positive sample "p" is from the source domain. The sample pool refining graph 500 includes a third graph point 506 which represents a position equal to the positive sample point plus a positive margin factor "m". Thus, the third arrow 512 shown in FIG. 5 represents the value of this positive margin factor "m". In other words the length of the third arrow 512 is equal to the positive margin factor "m". The sample pool refining graph 500 includes a fourth graph point 508 which represents a position equal to the positive sample point plus the positive margin factor "m" plus an additional value equal to the positive margin factor "m" multiplied by γ. γ here represents a non-negative coefficient that is smaller than one. Thus, the fourth arrow 514 shown in FIG. 5 represents the value of the positive margin factor "m" multiplied by γ. In other words the length of the fourth arrow 514 is equal to the positive margin factor "m" multiplied by γ.

The first arrow 516 shown in the sample pool refining graph 500 represents the value of the combination of the second arrow 510, the third arrow 512, and the fourth arrow 514 and may be represented by the formula $d_p(a^t, p^s)+(1+\gamma)m$ where the values γ and m are those described above.

Not all samples in the source domain are relevant to compute the triplet distance loss towards optimizing the target-side encoder 208 and the source-side encoder 206. Moreover, as the target-side encoder 208 and the source-side encoder 206 are repeatedly updated, the shape of the embeddings in the embedding z-space 210 also keeps changing. Consequently, distances in the triplet sample groups, namely between the anchor sample and the pairs $(p^s, n^s)$ of positive and negative samples from the source domain, are improved by revision after each epoch. While the number of samples acting as $a^t$ the anchor sample is small, the number of samples acting for the combination of $(p^s, n^s)$ are exceptionally large. Many from this large sample base $(p^s, n^s)$ do not, however, satisfy the relevancy of $[d_p-d_n+m]>0$. The accelerated ML training program 716 maintains triplets $(a^t, p^s, n^s)$ in the sample pool 430 if $d_n(a^t, n^s) \leq d_p(a^t, p^s)+(1+\gamma)m$ in other words if the distance between a particular negative sample of the triplet and the anchor sample is greater than or equal to the value of the first arrow 516.

Step 118 in at least some embodiments includes the accelerated ML training program 716 calculating distances among these samples in every epoch. The samples that fall within the first range 518 are used to compute the triplet loss distance for the training of the target-side encoder 208 and the source-side encoder 206 in steps 114 and 116, respectively. Samples that fall outside of this first range 518 are in at least some embodiments not used to compute this triplet loss distance for training, e.g., are not used for adjusting the weights of, the target-side encoder 208 and the source-side encoder 206. The samples that fall within the second range 520 may be maintained and stored in the first sample pool 430. The second range 520 is inclusive of the first range 518. The samples that fall within the third range 522 may be discarded as being less relevant to the particular target domain that has been selected. Thus, by using the sample pool relevancy evaluation the sample pool is refined to provide an improved pool for generating a machine learning model to make more accurate predictions in the target domain. At an epoch, if a significant number of samples have changed from being within the first range 518 to being outside of the first range 518 then the shape of the embeddings in the embedding space have significantly changed and the accelerated ML training program 716, in response, re-calculates distances for all of the triplet groups and re-update the sample pool 430. The change in at least some embodiments is considered significant if the change amount exceeds or equals a pre-determined threshold, e.g., if thirty percent or more of the samples have changed from being within the first range 518 to moving outside of the first range 518. An epoch may refer to one complete pass through the entire possible training dataset of labelled target and labelled domain samples.

In step 120 of the machine learning model accelerated training process 100 shown in FIG. 1, a determination is made as to whether the model performance has converged. If the determination of step 120 is affirmative in that the model performance has converged, the machine learning model accelerated training process 100 proceeds to step 122. If the determination of step 120 is negative in that the model performance has not converged, the machine learning model accelerated training process 100 proceeds to step 112 for a repeat of steps 112, 114, 116, 118, and 120 with respect to the refined pool sample. Thus, the steps 112, 114, 116, 118, and 120 may constitute a loop which is not exited until the model performance has converged, e.g., until the model convergence is sufficient, e.g., has passed a threshold convergence level.

Step 120 may in at least some embodiments be performed by applying a validation set of samples to the trained machine learning model. The performance may be numerically evaluated and compared to a pre-determined threshold. Exceeding the pre-determined threshold may indicate sufficient training and successful performance by the trained machine learning model. The performance achieved using the validation set may be logged by the accelerated ML training program 716 and tracked and compared to the performance of the machine learning model in earlier partially trained states. The error on that tracking data may decrease in the beginning and increase at a certain point during training. The checkpoint with the lowest error from the validation data should be selected for the prime training level. Thus, for step 120 if the performance has improved since the previous iteration, then the model performance is considered to have not yet converged so the training loop should continue. If the performance decreased since the last iteration, the most-recent weight adjustments may be discarded and the model (encoders and classifier) may be extracted in their state from the previous iteration.

In step 122 of the machine learning model accelerated training process 100 shown in FIG. 1, the trained target encoder and the trained classifier are provided as the trained target machine learning model. The trained target machine learning model may be stored in the persistent storage 713 on the computer 701 shown in FIG. 7 or stored in a remote server 704 that is accessible by the computer 701 as shown in FIG. 7.

Figure 6:
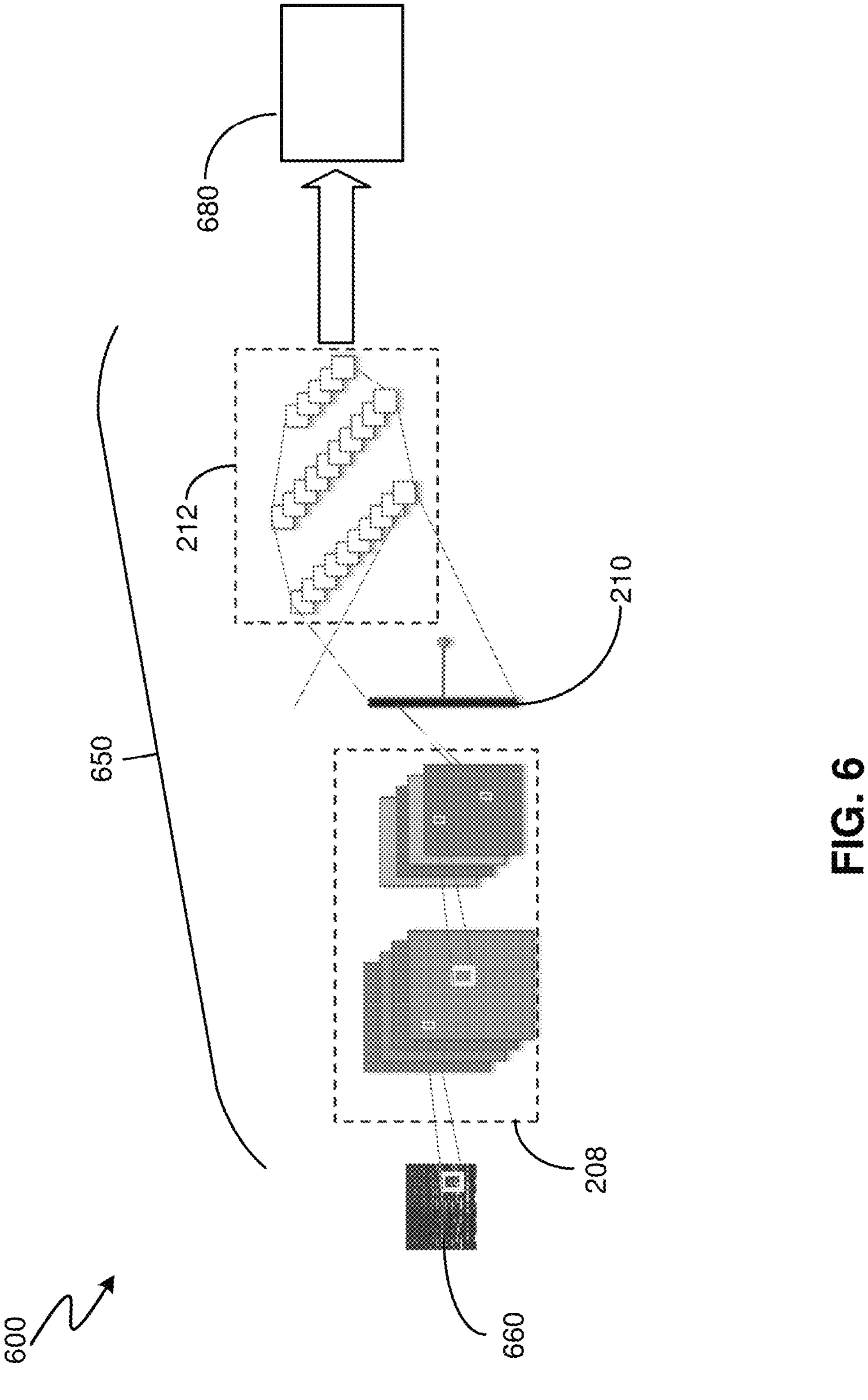
FIG. 6 illustrates components and prediction performance according to at least one embodiment of a machine learning model that was trained via the machine learning model accelerated training process of FIG. 1.

FIG. 6 shows an inference phase 600 being performed with the trained target domain machine learning model 650 that includes the target-side encoder 208 trained in the machine learning model accelerated training process 100 and also includes the classifier 212 that was trained in the machine learning model accelerated training process 100. The target-side encoder 208 may receive sample inputs from new unlabeled samples 660 from the target domain and may, in response thereto, generate an embedding in the embedding z-space 210. The classifier 212 may take the generated embedding from the embedding z-space 210 and pass it through the layers of the classifier and generate a class prediction 680 as the output. In one example the trained target domain machine learning model 650 may be able to receive images of random objects from a desert environment, indicate when one of the objects is from a class of vehicles, and provide a prediction/output that a vehicle is identified and indicating to which vehicle class the particular object belongs.

After step 122, the machine learning model accelerated training process 100 may end. The trained model may be used to perform a variety of machine learning tasks such as computer vision, natural language processing, and/or speech recognition.

The machine learning model accelerated training process 100 may also be subsequently performed to train a machine learning model for another domain which has few labelled samples for the domain. The same target samples or different target samples may be used for accelerating the process in this further iteration.

Training using the present embodiments was shown to provide improvements in class prediction for the trained model as compared to models trained by adjusting only the classifier. The present embodiments include explaining information among data samples within and between classes and domains for learning a domain independent space. The present embodiments include minimizing the difference between two domains in the embedding space not only relying on adversarial learning but also from optimizing the distance among samples of the same class and different class, within one domain and across different domains. The present embodiments include maintaining a pool of effective samples toward learning the domain encoders (generators), timely adapting to the change of the embedding space under training, and hence potentially converging faster and avoiding more computational overhead. In at least some embodiments the triplet groups are not constructed within one domain but across multiple domains.

The present embodiments exploit the combination of adversarial learning, supervised classification, and triplet loss regularization in a single system to use training achieved from labeled samples in a source domain to accelerate training for a target domain with few labeled samples. For example, labelled image samples from a zoo environment and including animal images may be used to train a machine learning model that is to perform class prediction to predict animal classes such as dog, wolf, or coyote in a forest environment. In other embodiments, labelled cartoon images of samples may be used as source samples to train a machine learning model for class prediction of images of a target domain of live animals within a particular environment. The present embodiments may include first training each network component individually and then aggregating and training them as a single model.

Moreover, the triplet loss samples are not required to be fixed in advance but may be varied over the course of the system training as their relevancy is evaluated in the latent common space between the two domains, which might not be known a priori. The present embodiments are hence more advantageous in accelerating training time, convergence rate and its robustness.

The present embodiments may include the identification and exploitation of a dynamic set of relevant triplet samples across domains to accelerate the system training process. By exploiting relevant triplet samples within and across two domains, the present embodiments can effectively regularize the learning process of common latent space between the two domains from which samples from both domains are well classified into known class labels. At least some embodiments allow iterative refinement of relevant triplet samples adaptively based on the current state of the latent space under optimization. This refinement benefits the training process by reducing the training time and boosting convergence rate and stability. The present embodiments may also include using a single source domain instead of multiple source domains to obtain samples to accelerate the ML training for the target domain. The present embodiments may also include performing the described training techniques to train a machine learning model for implementation in a single target domain with a few labelled samples instead of in multiple target domains. The target domain may include a large number of unlabeled samples for which the eventually trained machine learning model may perform class prediction. A pool of triplet sample groups may be kept and repeatedly revised by adapting to the changes of the latent embedding subspace. This revision may constitute a progressive identification of relevant samples. This sample pool updating helps narrow down the learnt subspace more effectively, accelerate the training time, as well as improve the robustness of the trained system.

It may be appreciated that FIGS. 1-6 provide only illustrations of certain embodiments and do not imply any limitations with regard to how different embodiments may be implemented. Many modifications to the depicted embodiment(s), e.g., to a sequence of steps or components that are depicted, may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 shown in FIG. 7 contains an example of an environment for the execution of at least some of the computer code involved in performing the inventive methods, such as accelerated ML training 716. In addition to accelerated ML training 716, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and multilingual machine learning model pretraining 716, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in multilingual machine learning model pretraining 716 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in multilingual machine learning model pretraining 716 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701) and may take any of the forms discussed above in connection with computer 701. EUD 703 typically receives helpful and useful data from the operations of computer 701. For example, in a hypothetical case where computer 701 is designed to provide a natural language processing result to an end user, this result would typically be communicated from network module 715 of computer 701 through WAN 702 to EUD 703. In this way, EUD 703 can display, or otherwise present, the result to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

obtaining a first set of labelled training data from a source domain;

obtaining a second set of labelled training data from a target domain, a number of labelled samples of the first set being greater than a number of labelled samples of the second set;

training a first machine learning model with the first set and the second set and with a discriminator so that the discriminator is unable to distinguish whether a sample, represented by an embedding produced via the first machine learning model in response to receiving the sample, is from the first set or from the second set;

training the first machine learning model with triplet loss regularization using the first set and the second set; and training a classifier of the first machine learning model using classification loss from the first set and the second set;

wherein the training of the first machine learning model with the discriminator and with the triplet loss regularization occurs iteratively in multiple epochs based on refining of a sample pool of the first set and the second set so that a first epoch of the multiple epochs is performed with a first version of the sample pool and a second epoch of the multiple epochs is performed with a second version of the sample pool, the second version being modified compared to the first version, wherein the sample pool comprises triplet sets of a respective anchor sample, a respective positive sample, and a respective negative sample, and the refining occurs by evaluating relevancy of the triplet sets in a latent common embedding space between the first set and the second set.

2. The method of claim 1, wherein the respective anchor sample and the respective positive sample together form a respective matching pair for a respective one of the triplet sets, wherein the respective anchor sample and the respective negative sample together form a respective non-matching pair for the respective one of the triplet sets, and wherein the refining further comprises comparing a first distance between the matching pair to a second distance between the non-matching pair to determine a triplet function value.

3. The method of claim 2, wherein the refining further comprises discarding a first triplet of the triplet sets for the iterative training in response to the triplet function value for the first triplet not exceeding a threshold value.

4. The method of claim 1, further comprising:

updating a first generator encoder of the first machine learning model based on:

domain loss from the training of the discriminator, distance loss from the training with the triplet loss regularization, and the classification loss;

wherein the trained first machine learning model for use in an inference phase comprises the updated first generator encoder and the trained classifier.

5. The method of claim 4, further comprising performing classification with the trained first machine learning model via:

inputting a new sample into the updated first generator encoder so that the updated first generator encoder generates an embedding in an embedding space and inputting the embedding into the trained classifier so that the trained classifier produces a class prediction.

6. The method of claim 1, wherein a first generator encoder of the first machine learning model is updated based on:

domain loss from the training with the discriminator, distance loss from the training with the triplet loss regularization, and the classification loss.

7. The method of claim 6, further comprising updating a second generator encoder based on:

the domain loss from the training with the discriminator, and the classification loss;

wherein the first generator encoder and the second generator encoder are used for the training with the discriminator and for the training of the classifier.

8. The method of claim 7, further comprising:

comparing at least one of a shape and a dimension of the labelled training data of the second set to a corresponding at least one of a shape and a dimension of the labelled training data of the first set; and initializing weights of the first generator encoder based on the comparing.

9. The method of claim 8, wherein via the comparison the at least one of the shape and the dimension of the labelled training data of the second set passes a similarity threshold with the corresponding at least one of a shape and a dimension of the labelled training data of the first set; and wherein the initialization comprises weights of the second generator encoder being implemented as the weights for the first generator encoder.

10. The method of claim 8, wherein via the comparison the at least one of the shape and the dimension of the labelled training data of the second set fails a similarity threshold with the corresponding at least one of a shape and a dimension of the labelled training data of the first set; and wherein the initialization comprises randomly initializing the weights of the first generator encoder.

11. The method of claim 1, wherein the triplet loss regularization comprises penalization in response to samples from the second set being mapped at a distance greater than a distance threshold from samples from the first set and from the second set having same class labels as the samples from the second set.

12. The method of claim 1, wherein the triplet loss regularization comprises penalization in response to samples from the second set being mapped at a distance less than a distance threshold from samples from the first set and from the second set having different class labels as the samples from the second set.

13. The method of claim 1, wherein the triplet loss regularization comprises:

penalization in response to samples from the second set being mapped at a first distance greater than a first distance threshold from samples from the first set and from the second set having same class labels as the samples from the second set and penalization in response to samples from the second set being mapped at a second distance less than a second distance threshold from samples from the first set and from the second set having different class labels as the samples from the second set.

14. The method of claim 1, wherein the source domain is of a first type and the target domain is of a second type different than the first type.

15. The method of claim 1, further comprising re-calculating distances for all triplet groups of the sample pool in response to a change amount of the sample pool exceeding or equaling a pre-determined threshold, wherein the change amount refers to a percentage of overall samples that are discarded from the sample pool due to being less relevant to the target domain, and wherein the re-calculating of the distances adjusts a shape of embeddings in the latent common embedding space.

16. The method of claim 1, wherein a first group of the triplet sets comprises respective anchor samples from the second set and respective positive or negative samples from the first set.

17. The method of claim 16, wherein a second group of the triplet sets comprises respective anchor samples from the second set and respective additional samples from the second set, and wherein the first group includes more of the triplet sets than the second group does.

18. The method of claim 1, wherein a first group of the triplet sets comprises respective anchor samples from the second set and respective positive and negative samples from the first set.

19. A computer system comprising:

one or more processors, one or more computer-readable storage media, and program instructions stored on at least one of the one or more computer-readable storage media for execution by at least one of the one or more processors to cause the computer system to:

obtain a first set of labelled training data from a source domain;

obtain a second set of labelled training data from a target domain, a number of labelled samples of the first set being greater than a number of labelled samples of the second set;

train a first machine learning model with the first set and the second set and with a discriminator so that the discriminator is unable to distinguish whether a sample, represented by an embedding produced via the first machine learning model in response to receiving the sample, is from the first set or from the second set;

train the first machine learning model with triplet loss regularization using the first set and the second set; and train a classifier of the first machine learning model using classification loss from the first set and the second set;

wherein the training of the first machine learning model with the discriminator and with the triplet loss regularization occurs iteratively in multiple epochs based on refining of a sample pool of the first set and the second set so that a first epoch of the multiple epochs is performed with a first version of the sample pool and a second epoch of the multiple epochs is performed with a second version of the sample pool, the second version being modified compared to the first version, wherein the sample pool comprises triplet sets of a respective anchor sample, a respective positive sample, and a respective negative sample, and the refining occurs by evaluating relevancy of the triplet sets in a latent common embedding space between the first set and the second set.

20. A computer program product comprising:

a computer-readable storage medium; and program instructions stored on the computer-readable storage medium, wherein the program instructions are executable by a processor to cause the processor to:

obtain a first set of labelled training data from a source domain;

obtain a second set of labelled training data from a target domain, a number of labelled samples of the first set being greater than a number of labelled samples of the second set;

train a first machine learning model with the first set and the second set and with a discriminator so that the discriminator is unable to distinguish whether a sample, represented by an embedding produced via the first machine learning model in response to receiving the sample, is from the first set or from the second set;

train the first machine learning model with triplet loss regularization using the first set and the second set; and training a classifier of the first machine learning model using classification loss from the first set and the second set;

wherein the training of the first machine learning model with the discriminator and with the triplet loss regularization occurs iteratively in multiple epochs based on refining of a sample pool of the first set and the second set so that a first epoch of the multiple epochs is performed with a first version of the sample pool and a second epoch of the multiple epochs is performed with a second version of the sample pool, the second version being modified compared to the first version, wherein the sample pool comprises triplet sets of a respective anchor sample, a respective positive sample, and a respective negative sample, and the refining occurs by evaluating relevancy of the triplet sets in a latent common embedding space between the first set and the second set.

* * * * *